United States Patent
Uerlichs et al.

[15] 3,695,286
[45] Oct. 3, 1972

[54] SHUT OFF VALVE OF LARGE DIAMETER PARTICULARLY A HOT-BLAST SLIDE VALVE

[72] Inventors: Johannes Uerlichs, Woffelsbach; Rudolf Muller, Merzenich, both of Germany

[73] Assignee: Hermann Rappold & Co. G.m.b.H., Duren-Birkesdorf, Germany

[22] Filed: March 30, 1970

[21] Appl. No.: 23,683

[52] U.S. Cl. ................................................. 137/340
[51] Int. Cl. ............................................. F16k 49/00
[58] Field of Search ............................. 137/340, 339

[56] References Cited

UNITED STATES PATENTS

| | | | |
|---|---|---|---|
| 1,951,677 | 3/1934 | Rosener | 137/340 |
| 2,132,262 | 10/1938 | Gabriel | 137/340 |
| 3,040,773 | 6/1962 | McInerney | 137/340 X |
| 3,202,171 | 8/1965 | Rappold et al. | 137/340 |
| 3,292,654 | 12/1966 | Rappold et al. | 137/340 |
| 3,448,761 | 6/1969 | Feinman | 137/340 X |
| 3,499,462 | 3/1970 | Berczynski | 137/340 |
| 3,524,467 | 8/1970 | Worley | 137/340 |

*Primary Examiner*—Samuel Scott
*Attorney*—Wenderoth, Lind & Ponack

[57] ABSTRACT

A large-diameter hot blast slide valve assembly embodying a slide valve member operable within a seat formed within a double walled casing or frame for the purpose of accommodating a coolant fluid introducable thereinto, and having a large diameter central flow passage way formed by an inner jacket wall which also forms the valve seat. One end of a cleanout/control tube is rigidly and sealingly connected with said inner jacket around an aperture formed therein generally opposite the slide valve member and its seat, and the tube projects generally radially through the outer wall of the casing or frame by passing freely through a clearance aperture therein. An outer portion of the cleanout control tube is sealingly connected but in a non-rigid manner to the outer wall of the casing by means of a relatively thin resilient or semi-flexible membrane which may in one form include an annular bellows-like construction, to thereby provide for thermal expansion and contraction movements of the tube relative to both the inner and outer casing walls to relieve potential structural stress and to preclude resultant damage otherwise attendant such thermal-stressed-induced fracturing of such valve assemblies.

1 Claim, 3 Drawing Figures

PATENTED OCT 3 1972

3,695,286

INVENTORS
JOHANNES UERLICHS
RUDOLF MÜLLER

BY *Wenderoth, Lind & Ponack*
ATTORNEYS

SHUT OFF VALVE OF LARGE DIAMETER PARTICULARLY A HOT-BLAST SLIDE VALVE

The invention refers to a shut off valve of large diameter particularly a hot-blast slide valve such as used on a blast-furnace operation in hot-blast mains of hot-blast stoves.

Such valves possess normally a double walled casing through which flows a cooling agent, and the inner jacket surrounds the space through which flows the hot-air blast, and in which a sliding tongue engaging radially to the flow passage is lead in a tightening manner towards the casing. With such prior art valves the inner jacket is often provided with has an opening generally in the direction of the axis of rotation of the sliding tongue, which is connected through a tube with the outer frame of the valve casing and serves as a control or cleaning hole. This permits a testing for leaks at this opening when in a closed sliding position, and on the other hand the opening also can serve to blow the dust away or to eliminate other materials which are deposited in the flow passage, thereby making it possible to detect and correct any leakage losses of the cooling agent. It is obvious that this tube when welded in between the inner jacket and the outer frame, the latter of which connects the control and cleaning hole and is subjected to both high temperatures of the hot-air blast in the area of the inner jacket as well as to lower temperatures along the cooling chamber to the outer frame, is subjected to considerably great thermal stress, particularly with respect to the expansion. Cracking often occurs particularly along the welding seams of this tube and thus bigger leakages in the cooling system, and consequently operating trouble of the slide valve are the unavoidable consequences of such thermal stresses. An object of the invention is to overcome the problem.

A further object is to provide such a shut off valve by this invention having a control and cleanout tube which is fastened tightly to the inner jacket of the slide casing which limits the flow area, and preferably then is connected through a flexible resilient or thermal yieldable membrane and eventually in a tight manner with the outer frame, or vice versa.

A further object is to provide a membrane which allows in a simple way compensation of the length expansions of the tube caused by different temperatures. This eliminates the danger that material breakages could occur in the tube due to internal stresses, and thus increases the reliability of the shut off valve.

With the above and other objects in view which will become apparent from the detailed description below, some preferred embodiments of the invention are shown in the drawings in which.

Figure 1:
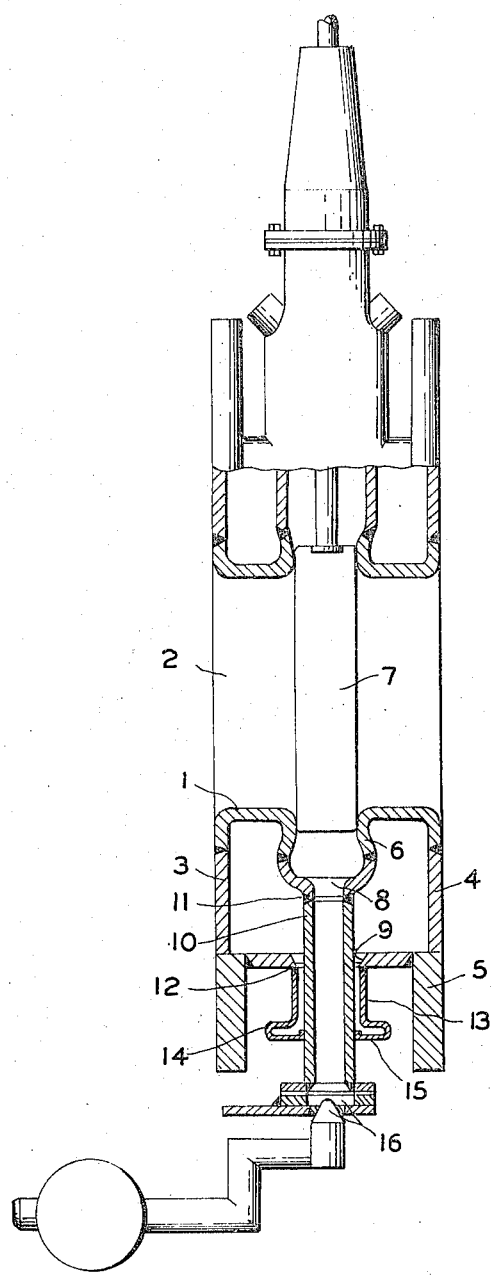
FIG. 1 shows a shut off valve in a partial cross section with some parts in elevation.
Figure 2:
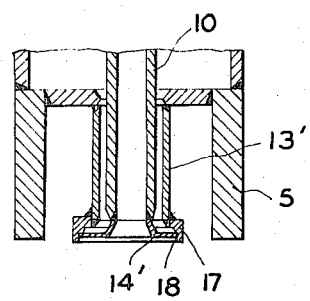
FIG. 2 shows a cross section of one method or means for suspending the membrane of the control and cleaning tube and FIG. 3 shows a cross section of a further method or means for suspending the membrane.
Figure 3:
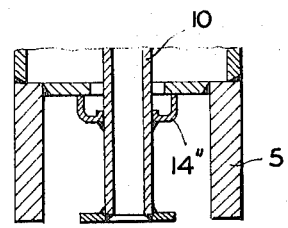

In FIGS. 1 to 3 an annularly formed inner therethrough, 1 defines and surrounds a flow passage 2 for the hot blast adapted to pass therethrough, and which jacket at its opposite ends or end faces is connected by means of spaced ring walls 3 and 4 with an outer annular frame 5 which also embodies the slide casing. The inner jacket 1 has an annular slot 6, into which engages in a tight seal way the slide tongue or valve slide 7 when in a closed position.

On the bottom of the annular slot 6 when viewing FIG. 1, there is provided an opening 8, to which there is welded at 11 a control and cleaning tube 10 which openly communicates with opening 8 and which tube 10 also freely penetrates the outer frame 5 through a clearance opening 9. At the edge of the circular clearance opening 9 there is welded at 12 one end of a tubular jacket 13 which surrounds the tube 10 coaxially and its free end is operatively and expansably connected via a metal membrane 14 with the outer jacket of the tube 10 through a further welding as at 15, in such a way, that there is provided the ability for an axial expansion or moving of tube 10 caused by the possibility of a thermally induced linear expansion within a range of several millimeters. The free end of tube 10 which protrudes from the slide casing preferably is in an operative connection with the inter-locking mechanism 16, which depending on the function of pipe 10 can be formed as desired.

In FIG. 2 the corresponding jacket 13' is formed somewhat longer than in FIG. 1, and the membrane 14' which is again fastened at one end onto the free end of tube 10 and at the other end is welded at point 18 to the annular flange 17 formed or provided at the free end of jacket 13'. This kind of membrane formation is particularly adequate when the range of the linear expansion of tube 10 is only very small, or anyway smaller than in the form of FIG. 1.

Also where the expected range of linear expansion is small, as in FIG. 3, it is possible to eliminate jacket 13 and/or 13' (FIGS. 1 and 2) and for the membrane 14" to be welded to tube 10 to establishes directly the connection with the outer frame.

We claim:

1. In a shut off valve assembly, particularly of the large diameter hot blast slide valve type, embodying a generally annular outer frame having a circumferential outer wall, an axially spaced apart double walled slide casing connected to said outer frame and adapted to receive a coolant agent therebetween, said slide casing having an inner circumferential jacket wall spaced radially inwardly of said frame outer wall and defining both a central flow passageway for hot air blasts, and also a generally annular valve-receiving seat or slotway, 2 slide valve member cooperable with said seat or slotway to selectively close and open said passageway, the improvement comprising in combination therewith a cleanout/control tube assembly connecting said inner jacket wall radially with said outer frame in a thermally expansion-accommodating manner to form a selectively openable and closeable communication passageway between said central flow passageway and the exterior of said valve assembly, said cleanout/control tube assembly including a tube member having one end rigidly fastened in sealed engagement around an aperture in said inner jacekt wall generally in alignment with said slide valve member and having the other end of said tube projecting freely in a radial manner through a clearance aperture in said outer frame circumferential wall, means including a resilient and flexible membrane sealingly interconnecting in a thermally expansible contractable manner a radially outer portion of said cleanout/control tube member with said outer frame in an area surrounding said clearance aperture therein.

* * * * *